Dec. 13, 1960   D. J. MATILE   2,963,845
END SHOE FOR SICKLE-TYPE MOWER
Filed Nov. 17, 1958

INVENTOR.
Daniel J. Matile
BY
ATTORNEY.

2,963,845

END SHOE FOR SICKLE-TYPE MOWER

Daniel J. Matile, Box 216, Americus, Kans.

Filed Nov. 17, 1958, Ser. No. 774,378

1 Claim. (Cl. 56—314)

This invention relates to farm implements and more particularly to an improved end shoe for power driven sickle type mowers.

It is well known that such sickle type mowers are used primarily in the cutting of tall grain, grass or the like and that the end shoes usually provided on such mowers have access openings therein to allow attachment of the shoe to the end of the cutter bar. It is also well known that such access openings and other openings as are provided in conventional end shoes tend to become clogged with the grass, grain or the like being cut, thus impeding the progress of the mowing machine and making it necessary to frequently clean the end shoe.

Accordingly it is the primary object of this invention to provide an end shoe for sickle type mowers that will not become clogged and which is so constructed that grass, grain or the like will not become entangled in the end shoe and thus interfere with, or hinder the operation of the mower.

A further object of this invention is to provide an end shoe which has a central frame portion adapted for attachment to the outermost end of the sickle bar, the frame having a forwardly extending, upturned toe, and a rearwardly extending substantially vertical plate, both the frame and the plate being provided with deflecting means which eliminate the opportunity for the material being cut to become entangled with any part of the end shoe.

A still further aim of the invention is to provide an end shoe having an adjustable, ground engaging runner disposed therebeneath which facilitates the uninterrupted movement of the end shoe and sickle bar through the material to be cut.

Other objects will become apparent from the following specification and accompanying drawing wherein.

Figure 1:
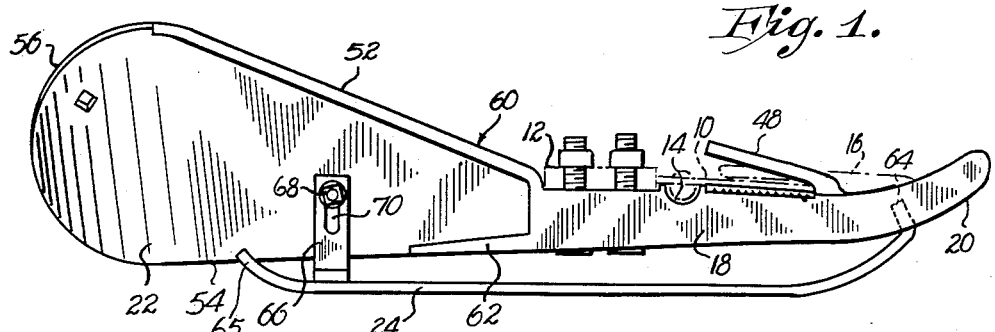
Figure 1 is a side elevational view of the end shoe made in accordance with the present invention.

The drawings illustrate the invention in association with a conventional sickle type mower, the sickle being broadly designated by the numeral 10. Sickle 10 is composed of a supporting beam 12 which carries a sickle bar 14 mounted for rectilinear reciprocating movement with respect thereto. Attached to bar 14 for movement therewith are a plurality of cutting knives 15 having guards 16.

The end shoe contemplated by the present invention is adapted for attachment to the outermost ends of beam 12 and bar 14 and consists broadly of a central frame 18, a forwardly extending, upturned toe element 20 integral with the frame, a rearwardly extending, substantially vertical plate 22 and a runner 24 carried beneath the shoe in supporting relationship thereto.

Frame 18 consists of an elongated, substantially rectangular member formed, preferably of metal, and having an upper face 26 and a lower face 28. A lateral projection 30 is formed as a part of frame 18 and extends from the normally innermost side of frame 18, the upper surface 32 of projection 30 being flush with face 26. A seat 34 formed in surface 32 and face 26 receives beam 12, the beam 12 being secured to frame 18 and projection 30 by bolts 36 and 38 respectively. A groove 40 formed in projection 30 and face 26 forwardly of seat 34 slidably receives the end of bar 14. Groove 40 is formed to mate with bar 14 and as shown in the drawing is of arcuate configuration.

A substantially triangular cutter blade 42 is secured to face 26 of frame 18 forwardly of groove 40, the base edge of blade 42 being adjacent and parallel with groove 40. Stationary blade 42 has the side edges 44 thereof serrated and the innermost of said edges is so positioned as to cooperate with the proximal knife 15 as the latter is reciprocated and thus cut any material brought therebetween. Fastening means such as rivet 46 is used to secure blade 42 to frame 18.

Figure 2:
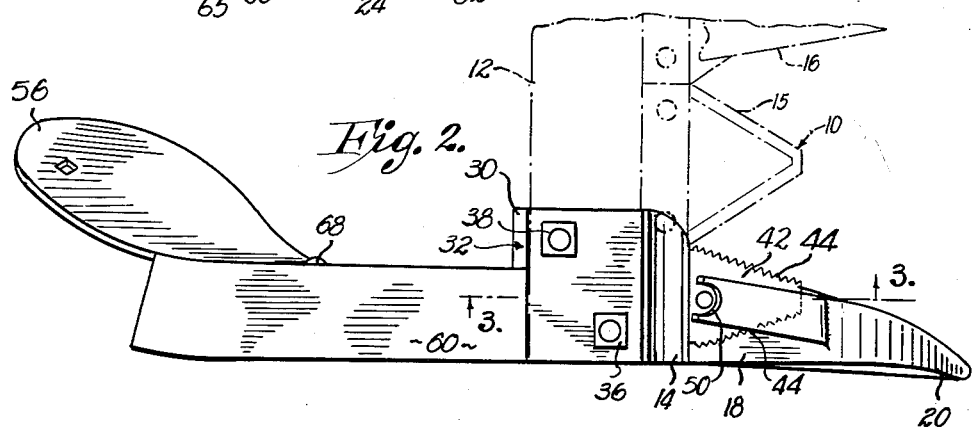
Figure 2 is a top plan view thereof.
Figure 3:
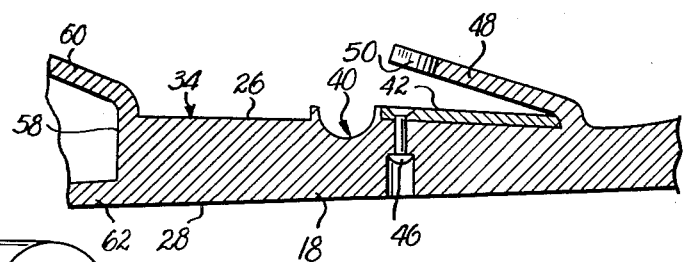
Figure 3 is an enlarged, fragmentary sectional view taken along line 3—3 of Figure 2.

Toe 20 is integral with the normally forwardmost end of frame 18 and forms a continuation thereof. The upturned end of toe 20 is tapered to a point and is turned slightly outwardly, all as best seen in Figure 2.

A deflector extension 48 formed as a part of frame 18, is integral with the upper face 26 thereof and is inclined upwardly and rearwardly from a point immediately forward of the apex end of blade 42. Extension 48 is in spaced, overlying relation to blade 42, the free end thereof being provided with a notch 50 for access to fastening means 46 whereby blade 42 may be easily removed and replaced if necessary.

Figure 4:
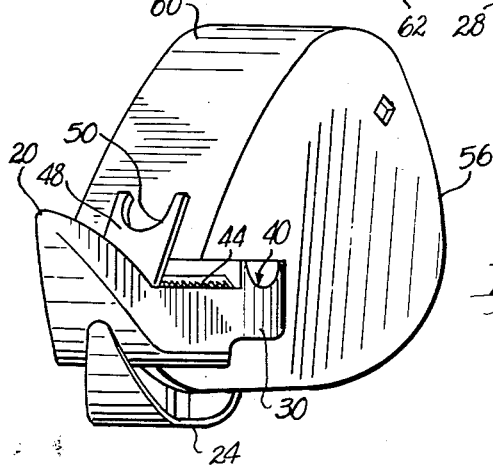
Figure 4 is a front, perspective view thereof.

The opposite end of frame 18 from that having toe 20 thereon has secured thereto plate 22. Plate 22 is substantially vertical and has an upper edge 52 and a lower edge 54, the edges converging as frame 18 is approached. The rear edge 56 of plate 22 is arcuate and said edge 56 as well as the rearmost portion of plate 22 is inclined inwardly and downwardly in a rolling configuration as best seen in Figures 2 and 4. The front edge 58 of plate 22 is secured to frame 18.

A flange 60, integral with frame 18 and plate 22, extends rearwardly from frame 18 and outwardly from edge 52 of the plate 22, the flange terminating at substantially the beginning of arcuate rear edge 56. A rearwardly extending arm 62 on frame 18 is secured to and underlies a front portion of edge 54 and aids in the support of plate 22.

Runner 24, which consists of a flat strip of metal having upturned ends, has the normally forwardmost end 64 thereof inserted within a suitable hole formed in the lower surface of toe element 20. Said forwardmost end 64 is tapered to a point, and thus end 64 is substantially identical in configuration to toe element 20.

The rear end 65 of runner 24 has an upwardly extending bracket 66 affixed thereto which bracket 66 lies against the outer face of plate 22 and is releasably attached thereto by bolt 68. Elongated slot 70 formed in bracket 66 allows the same, and thus runner 24 to be adjusted vertically with respect to the end shoe, to the end that runner 24 may at all times engage the ground and support the end shoe at a desired height thereabove.

Thus it is seen that there is provided an end shoe which may be easily and quickly attached to a conventional sickle mower and which when so attached and in use, is not subject to becoming clogged with grass, grain or the like with the resulting impairment of cutting operations.

Having thus described the invention, what is claimed as new and desired to be secured by Letters Patent is:

A shoe for the end of a sickle bar having cutting knives, said shoe including an elongated frame having an upper and a lower face; a seat formed in said upper face for receiving an end of the sickle bar; an upturned, forwardly extending toe element integral with and forming a continuation of one end of said frame, said toe having a convex side margin facing said bar and a concave side margin facing outwardly away from said bar; a substantially vertical plate integral with the opposite end of the frame, said plate having an upper, lower and rear edge, said upper and lower edges converging as said frame is approached, said rear edge being arcuate and said rear edge and the rearmost portion of said plate being inclined inwardly and downwardly in a rolling configuration; a stationary, substantially triangular cutter knife having at least a pair of serrated edges, said knife fixed to the upper face of said frame forwardly of said seat to cooperate with the proximal knife of the sickle bar; an elongated deflector extension integral at one end with said upper face and inclined upwardly and inwardly therefrom in overlying spaced relation to said stationary cutter knife, the other end of said extension terminating in spaced relation to said frame and vertical plate, the said other end being in substantially vertical alignment with the rearmost base end of said stationary cutter knife; and a ground engaging runner disposed beneath the shoe, said runner having its forwardmost end interconnected with said toe element and its rearmost end releasably and adjustably interconnected with said plate.

References Cited in the file of this patent
UNITED STATES PATENTS

| | | |
|---|---|---|
| 121,123 | Owen | Nov. 21, 1871 |
| 513,834 | Smith | Jan. 30, 1894 |
| 637,639 | Mischler | Nov. 21, 1899 |
| 1,755,506 | Jackson | Apr. 22, 1930 |